D. STAHLEY.
RETARDING DEVICE FOR CORN BINDERS.
APPLICATION FILED FEB. 21, 1914.
1,109,712.  Patented Sept. 8, 1914.
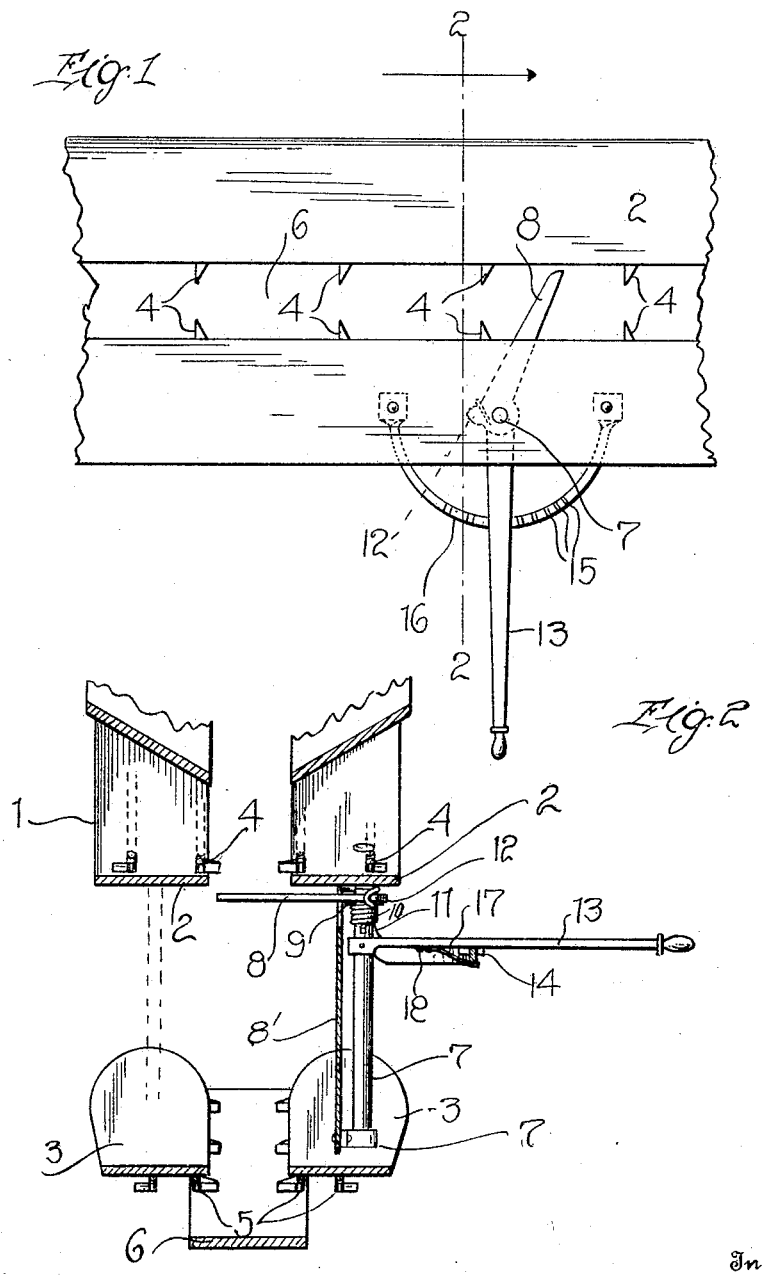
Inventor
D. Stahley
Witnesses
Robert M. Sutphen
A. I. Hind
By Watson E. Coleman
Attorney

UNITED STATES PATENT OFFICE.

DANIEL STAHLEY, OF KIRK, COLORADO.

RETARDING DEVICE FOR CORN-BINDERS.

1,109,712.  Specification of Letters Patent.  Patented Sept. 8, 1914.

Application filed February 21, 1914. Serial No. 820,344.

*To all whom it may concern:*

Be it known that I, DANIEL STAHLEY, a citizen of the United States, residing at Kirk, in the county of Yuma and State of Colorado, have invented certain new and useful Improvements in Retarding Devices for Corn-Binders, of which the following is a specification, reference being had to the accompanying drawings.

This invention relates to new and useful improvements in retarding devices for corn binders, the main object of the invention being to provide a spring retarder which is particularly adapted for application to corn binders and is to be disposed between the guide boards for the conveyer chains to retard and straighten the corn stalks before they reach the binding plates so that all of the stalks will be disposed in a substantially vertical position before bundling.

Another object of the invention is the provision of a spring retarding device of the above character which possesses points of efficiency and durability, is inexpensive to manufacture and, at the same time, is simple in construction and operation.

With the above and other objects in view, this invention consists in the novel features of construction and the combination and arrangements of parts to be hereinafter more fully described, pointed out in the claim and shown in the accompanying drawing, in which, Figure 1 is a top plan view illustrating the application of my invention; and Fig. 2 is a transverse sectional view taken on the line 2—2, of Fig. 1.

Referring more particularly to the drawing, 1 indicates a corn binder of any general construction, having the upper guide boards 2 and the lower guide boards 3. Mounted upon the upper guide boards are the upper sets of conveyer chains 4, while arranged beneath the lower guide boards 3, are the lower sets of conveyer chains 5. Disposed directly beneath the lower conveyer chains 5, is the chute 6, upon which the lower ends of the corn stalks ride, when passing upwardly with the conveyer chains to the gathering prongs, not shown.

It will be understood that the main object of the present invention, as stated before, is to straighten the shorter corn stalks before they reach the bundling device, as it is a well known fact that in harvesting corn, the shorter stalks where the tops thereof are not engaged with the upper conveyer chains sufficiently to retain them in an upright position, will drop backward and reach the bundling device in a slanting position, thus making an uneven bundle which has to be generally expelled from the machine by main force.

It is also apparent that the thin standing row of stalks, although tall, will fall to the same slanting position as the short stalks, from the fact that they are thin and standing far apart and do not fill out the space between the upper conveyer chains and, therefore, cannot be held by the lugs on the chains, and although the chute does not have to be raised, as for the short corn stalks, it still is disposed in an inclined position, therefore the friction between the butts of the stalks and the chute will provide a retarding effect and, in view of the fact that the tops of the stalks will not be held, will cause them to act in the same manner as the short stalks. Thus the retarding arm which will be more fully described hereinafter, will engage the tops of the stalks and straighten them before they reach the bundling device.

My improved spring retarder includes an upright standard 7, the upper end of which is secured to the lower face of one of the upper guide boards 2, while the lower end thereof is secured by means of a bearing 7' to the shield or guard 8'. The bearing 7' is bolted or otherwise secured to the shield to securely retain the standard 7 in its effective position. Mounted upon the standard at the upper end thereof, is the retarding arm 8 which projects outwardly at right angles with respect to the standard and is supported by means of the transverse pin 9, upon which the inner end of the arm 8 rests.

Coiled around the standard 7, is a spring 10, the ends of which are fixed to the standard as indicated by the numeral 11 and the intermediate portion thereof is engaged with the outwardly projecting lug 12 formed upon the arm 8, so that the rotary movement of the arm in one direction upon the standard will place the spring under tension so that after pressure has been released from the arm, the tension of the spring will return the arm to its normal position.

Mounted upon the standard 7 and arranged beneath the retarding arm 8, is an adjusting lever 13 which is provided with a downwardly projecting blade 14 adapted to engage within the notches 15 formed in the rack 16. The rack 16 is preferably arcuate in form and the ends thereof are bent upwardly at an angle and secured to the under side of one of the upper guide boards in any suitable manner. The blade 14 is yieldably retained within any of the notches 15 by means of the spring 17, one end of which is rigidly secured beneath the lever 13, as shown at 18, while the other end thereof yieldably engages beneath the rack to securely retain the lever in its effective position.

From the above it will be readily apparent that the effective resistance of the retarding arm 8 may be readily adjusted by rotating the standard 7 in either direction. From the above description taken in connection with the accompanying drawing, it will be apparent that when the corn stalks strike the retarding arm 8, they will have a tendency to press the arm rearwardly and, at the same time, slide upwardly on the same until they are in a substantially vertical position, and as the stalks press against the arm, the spring 10 will be placed under tension as the arm passes rearwardly around the standard 7, to allow the stalks bearing against the arm, to pass into the bundling device.

It is a well known fact that in guiding corn where the stalks are short and uneven, the chute upon which the lower ends of the stalks ride is raised so that the upper ends of the stalks will engage with the upper conveyer chains. Thus, as the chute is disposed upon an incline, the friction of the stalks bearing against the incline will retard the lower ends of the stalks and as there is no retarding means for the upper ends of the stalks, they will pass rearwardly much faster than the butts of the stalks, so that when they reach the bundling device they are generally in a slanting position and when tied together, will make an uneven bundle which has to be expelled from the machine by main force, whereas, upon the use of my attachment, the upper ends of the stalks will engage with the retarding arm 8 and are straightened before reaching the bundling device.

It will be apparent that any number of my improved retarding arms may be used upon a single harvester and disposed at intervals upon the guide boards, so that the corn stalks which generally have a tendency to fall rearwardly to a slanting position, will be all straightened before they reach the bundling device.

While I have shown and described the preferred form of my invention, it will be obvious that various changes in the details of construction and in the proportions may be resorted to for successfully carrying my invention into practice without sacrificing any of the advantages of the invention, as defined by the scope of the appended claim.

Having thus described this invention, what is claimed is:—

The combination with the upper and lower conveyers, of a corn harvester, of a rotatable standard disposed between said conveyers, an outwardly projecting arm mounted thereon and adapted to rotate independently thereof, a coil spring mounted upon said standard and having a portion thereof engaging the standard and another portion thereof engaging the inner end of the arm to retain the same in an operative position, a rack suspended between said conveyers, a lever mounted upon the standard whereby to rotate the same and place the coil spring under tension, said lever engaging the rack to retain the same in an adjusted position, and a spring member secured at one end to the lever and having its other or free end bearing against the under side of the rack to yieldably retain the lever in an adjusted position.

In testimony whereof I hereunto affix my signature in the presence of two witnesses.

DANIEL STAHLEY.

Witnesses:
H. M. HAWORTH,
R. B. COOK.

Copies of this patent may be obtained for five cents each, by addressing the "Commissioner of Patents, Washington, D. C."